US012582858B1

(12) United States Patent
Pipe et al.

(10) Patent No.: US 12,582,858 B1
(45) Date of Patent: Mar. 24, 2026

(54) FIRE PROTECTION SYSTEMS AND METHODS FOR THE PROTECTION OF SLOPED ATTIC SPACES

(71) Applicant: Minimax Viking Patent Management GmbH, Bad Oldesloe (DE)

(72) Inventors: Jed Edmond Pipe, Byron Center, MI (US); Shawn Gregory Orr, Grand Rapids, MI (US)

(73) Assignee: Minimax Viking Patent Management GmbH, Bad Oldesloe (DE)

( * ) Notice: Subject to any disclaimer, the term of this patent is extended or adjusted under 35 U.S.C. 154(b) by 93 days.

(21) Appl. No.: 18/125,974

(22) Filed: Mar. 24, 2023

Related U.S. Application Data

(63) Continuation of application No. 16/685,316, filed on Nov. 15, 2019, now Pat. No. 11,654,316.

(60) Provisional application No. 62/768,691, filed on Nov. 16, 2018.

(51) Int. Cl.
*A62C 35/68* (2006.01)
*B05B 1/26* (2006.01)
*E04B 1/94* (2006.01)

(52) U.S. Cl.
CPC .............. *A62C 35/68* (2013.01); *B05B 1/267* (2013.01); *E04B 1/94* (2013.01)

(58) Field of Classification Search
CPC ................................ A62C 35/68; B05B 1/267
See application file for complete search history.

(56) References Cited

U.S. PATENT DOCUMENTS

| | | | | |
|---|---|---|---|---|
| 3,081,041 | A | 3/1963 | Showalter, Jr. | |
| 3,881,653 | A | 5/1975 | Birckhead | |
| 5,669,449 | A | 9/1997 | Polan et al. | |
| 6,182,767 | B1 * | 2/2001 | Jackson | A62C 31/02 244/114 R |
| 8,083,002 | B1 | 12/2011 | Golinveaux et al. | |
| 8,800,673 | B2 | 8/2014 | Multer et al. | |
| 9,149,818 | B1 | 10/2015 | Orr | |
| 11,673,008 | B1 | 6/2023 | Pipe et al. | |
| 2011/0024138 | A1 * | 2/2011 | Multer | A62C 35/58 169/54 |
| 2017/0165511 | A1 | 6/2017 | Meyer et al. | |

(Continued)

OTHER PUBLICATIONS

Globe Fire Sprinkler Corporation, GFS-650: "Specific Application Attic Sprinklers" (Jul. 2018); 22 pages.

(Continued)

*Primary Examiner* — Tuongminh N Pham
(74) *Attorney, Agent, or Firm* — Perkins Coie LLP

(57) ABSTRACT

Attic fire protection sprinklers for protection of the eave regions of the attic space. The eave sprinkler has a fluid deflector for generating a directional spray with a horizontal throw of up to twenty-eight feet (28 ft.). The deflector includes a base having a leading edge with a flap extending angularly from the leading edge of the base. The flap forms a discharge channel that widens in the radial direction from the sprinkler axis. The flap includes a central canopy portion and a pair of sidewalls disposed about the central canopy portion. An attic fire protection system is provided that includes the eave sprinkler to provide a maximum roof span of protection of up to eighty feet (80 ft.) and a roof slope of protection that ranges from 2½:12 to 6:12.

17 Claims, 4 Drawing Sheets

(56) References Cited

U.S. PATENT DOCUMENTS

2021/0353988 A1 11/2021 Desrosier

OTHER PUBLICATIONS

Reliable Automatic Sprinkler Co., Inc. Models DD56-6, DD56-27, DD80-6, DD80-27, DS56, GP56, AH42, & AH56 . . . Bulletin 056, 09/18; 26 pages.
The Viking Corporation, Form No. F-043015: “Model V-SD Specific Application Attic Sprinkler” (Feb. 19, 2016 Rev. 16.1); 12 pages.
The Viking Corporation, Form No. F-042517: Attic Upright Specific Application Sprinkler VK697, Aug. 18, 2023 Rev 18.2, 8 pages.
The Viking Corporation, Form No. F-042815: Attic Upright Specific Application Sprinkler VK696, Oct. 18, 2011 Rev 18.2.P65, 7 pages.
Tyco Fire Products, Technical Datasheet, “Models BB, SD, HIP, and AP Specific Application Sprinklers For Protecting Attics”, TFP610, Aug. 2018, 28 pages.

* cited by examiner

FIRE PROTECTION SYSTEMS AND METHODS FOR THE PROTECTION OF SLOPED ATTIC SPACES

PRIORITY CLAIM & INCORPORATION BY REFERENCE

This application is a continuation of U.S. patent application Ser. No. 16/685,316, filed Nov. 15, 2019, which claims the benefit of U.S. Provisional Application No. 62/768,691 filed Nov. 16, 2018, each of which is incorporated by reference in its entirety.

TECHNICAL FIELD

The present invention relates generally to fire protection sprinklers, systems and methods for the protection of attic spaces. In particular, the present invention is directed to fire protection sprinklers, systems and methods for the protection of combustible and non-combustible sloped attic spaces.

BACKGROUND ART

The design and installation of automatic fire sprinkler protection systems is dependent upon several factors including: the area to be protected, the occupants or items to be protected in the area being protected, the manner in which a fire is to be addressed. One particular area of interest is automatic fire protection systems for attic spaces beneath sloped roofs. Generally, a sloped attic space includes a floor in the form of a horizontal ceiling deck with two sloped roof decks supported above the ceiling deck to enclose the attic space. The roof decks are angled with respect to one another to form a ridgeline or peak of the attic space. Each of the roof decks slope down from the peak toward the ceiling deck to define the slope down direction and form eave regions with the lateral ends of the ceiling deck. In a gable roof construction, for example, the attic space, when viewed in elevation, is triangular with the peak forming the upper vertex and the eave region forming the other two vertices of the triangle proximate the ceiling deck. In plan, the length of the peak ridge line defines the axial length of the sloped attic space and the distance from eave to eave along the ceiling deck perpendicular to the ridge line defines the span of the attic space.

Attic fire protection systems locate one or more automatic fire protection sprinklers about the attic space for delivering and distributing firefighting fluid in response to a fire or sufficient level of heat. Generally, automatic fire protection sprinklers include a solid metal body and some type of deflector to distribute fluid discharged from the body in a defined spray distribution pattern. Fluid discharge from an automatic fire protection sprinkler is automatically controlled by operation of a heat-responsive actuator that maintains a fluid tight seal at the discharge orifice by exertion of pressure on a cap (button or disc) or other sealing assembly. When the temperature surrounding the sprinkler is elevated to a pre-selected value indicative of a fire, the actuator operates thereby permitting ejection and release of the cap by the discharge of fluid through the unsealed sprinkler.

Automatic sprinklers can be characterized by: its discharge characteristics, its installation orientation (pendent or upright), and its fluid distribution and coverage. Several factors can influence the fluid distribution patterns of a sprinkler and its coverage including, for example, the shape of the sprinkler frame, the sprinkler orifice size or discharge coefficient, the installation orientation and the geometry of the deflector. The discharge or flow characteristics from the sprinkler body is defined by the internal geometry of the sprinkler including its internal passageway, inlet and outlet (the orifice). As is known in the art, the K-factor of a sprinkler is defined as $K=Q/(P)^{1/2}$, where Q is fluid flow rate from the sprinkler for a given fluid starting pressure P, each of which is measured in appropriate metric or English units. For example, Q represents the flow rate (in gallons/min GPM) and P represents the pressure (in pounds per square inch (psi.)) of water or firefighting fluid fed into the inlet end of the internal passageway though the sprinkler body.

Examples of known attic sprinkler configurations are shown and described in U.S. Pat. Nos. 9,149,818; 8,083,002; and 5,669,449. The sprinklers show a variety of deflector geometries for distributing for firefighting fluid within an attic space. For example, U.S. Pat. No. 9,149,818 shows and describes an upright sprinkler with a fluid deflector having a central deflecting portion, sidewalls and two angled flaps opposed about the central deflector for redirecting a divided fluid stream in opposed downward angled directions. U.S. Pat. No. 8,083,002 shows and describes an upright sprinkler with a circular fluid deflector for distributing firefighting fluid in a substantially circular cylindrical or radially uniform spray pattern about the sprinkler body. U.S. Pat. No. 5,669,449 shows and describes other attic sprinklers including an upright sprinkler with a deflector geometry for distributing firefighting fluid in a unidirectional or single direction. The fluid deflector includes a central deflecting portion with sidewalls to direct firefighting fluid in the designed single direction. In the directional fluid deflectors, the central deflecting portions are shown with a constant width about which the sidewalls extend.

In attic fire protection systems, automatic sprinklers are coupled to one or more fluid supplying branch lines that extend through the attic space. The number of sprinklers, their relative spacing and location within the attic space is dependent on several design factors including the fluid supply criteria or hydraulic demand to deliver a requisite flow rate or supply pressure of fluid to a number of design sprinklers or a requisite fluid density of fire fluid, i.e., flow per area measured in (gallons per minute (GPM) per square foot (sq. ft.)) to a design area of a specified size. Industry accepted installation standards generally require a delivered fluid density of 0.1 GPM/sq. ft over a design area to be protected. Alternatively, systems can demonstrate the requisite fluid distribution capability by using automatic sprinklers that have satisfactorily performed in full-scale actual fire test in which the automatic sprinkler delivered a constant flow of firefighting fluid when supplied with the fluid at a constant pressure.

The design sprinklers of a system are an identified number of "most hydraulically remote sprinklers" subject to one or more design criteria. As used herein, the most hydraulically remote sprinklers are those sprinklers that experience the greatest fluid pressure loss relative to the fluid supply source when supplying the sprinklers with the minimum fluid flowing operating pressure for the sprinkler. In satisfying the preferred hydraulic criteria of the system, it can be shown by hydraulic calculation that if all design sprinklers activate, the piping and supply can provide the required fluid flow. Alternatively, or additionally, the hydraulic criteria of the system can be shown by hydraulic calculation, that if all design sprinklers activate, the piping and supply can deliver a minimum operating pressure of firefighting fluid to the design sprinklers to provide for a minimum fluid density of 0.1 GPM/sq. ft. over the design area.

One design factor limiting the performance of an automatic fire protection system for attics is the roof span of the attic space to be protected. For example, one known system from Viking Corp. provides protection of sloped roof attic spaces having a roof span up to a maximum of sixty feet (60 ft.) for roof slopes that range from 4 inch of vertical rise for 12 inches of horizontal run (4:12) to 12 inches of rise for 12 inches of run (12:12). The system is shown and described in technical data sheet publication Form No. F-043015: "Model V-SD Specific Application Attic Sprinkler" (Feb. 19, 2016 Rev. 16.1) from The Viking Corp of Hastings, MI. Generally, the Viking system provides one line of sprinklers aligned below and parallel the ridge line to provide a uniform radial spray pattern. Unidirectional type sprinklers are located between the roof peak and the eaves. These directional sprinklers direct their spray toward the eaves for the protection of this region of the attic.

Another known system from Globe Fire Sprinkler Corporation of Standish, MI provides for three branch lines to which sprinklers are connected for protection of sloped roof attic spaces having a roof span up to a maximum of seventy-two feet (72 ft.) for roof slopes that ranges from 3 inch of vertical rise for 12 inches of horizontal run (3:12) to 6 inch of rise for 12 inches of run (6:12). The system is shown and described in technical data sheet publication GFS-650: "Specific Application Attic Sprinklers" (July 2018) available at <https://globesprinkler.com/uploads/files/GFS-650_20180730CM_745.pdf>. Generally, the Globe system provides one branch line of sprinklers aligned below and parallel the ridge line with each of the other two branch lines of sprinklers aligned downslope of and parallel the ridge line between the peak and the eaves. These downslope sprinklers direct their spray toward the eaves for the protection of this region of the attic. With its three-branch line system alone, the Globe system is limited to protection of a maximum roof span of seventy-two feet. Protection of larger roof spans in the Globe or other attic fire protection systems require the installation of more branch lines and sprinklers and/or sprinklers installed in close proximity to the eave regions.

Expanding the range of roof span protection beyond seventy-two feet (72 ft.) can present additional problems for the fire protection system designer, installer and/or owner-operator. In particular, the addition of sprinklers and/or branch supply lines can increase the overall hydraulic demand and installation cost of the system. Moreover, requiring sprinklers to be installed close to the eave regions can make the installation difficult as the clearance for work space decreases as the sloped roof approaches the ceiling deck proximate the eave regions. Accordingly, a need remains for fire protection of roof spans over seventy-two feet and larger.

DISCLOSURE OF INVENTION

Preferred sprinklers, systems and methods are provided for protection of sloped roof attic spaces with maximum roof spans over seventy-two feet preferably ranging from seventy-two to eighty feet (72-80 ft.). A preferred sprinkler for protection of the eave regions includes a frame having a body defining an inlet, an outlet with a passageway extending between the inlet and the outlet along a sprinkler axis to define an orifice. A preferred deflector is affixed to the sprinkler frame at a fixed distance from the outlet for deflecting fluid in a direction of a radial axis that extends perpendicular to the sprinkler axis. The sprinkler and its preferred deflector provide for a horizontal throw of over twenty-four feet preferably up to twenty-eight feet when provided with a fluid flow rate of firefighting fluid of twenty-three gallons per minute (23 GPM) at a fluid pressure of seventeen pounds per square inch (17 psi). The fluid distribution provides for a fluid distribution density of 0.1 GPM/sq. ft. over a preferred (8 ft.×28 ft.) coverage area.

The preferred deflector includes a base mounted to the sprinkler frame having a leading edge with a flap extending angularly from the leading edge of the base. The flap forms a discharge channel extending in the radial direction with the channel being symmetrical about a bisecting plane. The discharge channel preferably widens in the radial direction and in preferred embodiments are trapezoidal in shape. In preferred embodiments of the deflector, the flap includes a central canopy portion intersecting the bisecting plane with a first end contiguous with the leading edge of the base and a second terminal end spaced from the first end. The flap includes a pair of sidewalls disposed about the central canopy portion. Each of the sidewalls are angled with respect to the bisecting plane to define an acute first included angle, preferably about fifteen degrees (15°) such that the discharge channel broadens in the direction from the first end to the second terminal end of the flap.

The preferred eave sprinkler alone and in combination with other types of sprinklers provides for a fluid distribution that defines a span of attic protection in a three-branch system that is over sixty feet (60 ft.) and at its maximum preferably ranges from seventy-two to eighty feet (72-80 ft.) and more preferably ranges from seventy-five feet to eighty feet (75-80 ft.). In a preferred three branch fire protection system for a sloped attic space, a plurality of sprinklers of a first type are aligned below the attic ridge and coupled to a first fluid supply branch line. Each sprinkler of the first type has a frame defining an inlet, an outlet with a passageway extending between the inlet and the outlet along a sprinkler axis and a deflector affixed to the sprinkler frame at a fixed distance from the outlet to generate a uniform spray about the sprinkler axis. Sprinklers of the first type are preferably embodied as upright attic sprinklers in which its fluid distribution provides for a fluid distribution density of 0.1 GPM/sq. ft. over a preferred (8 ft.×24 ft.) coverage area when provided with a flow rate of 20 GPM of firefighting fluid at 13 psi.

The preferred eave sprinkler provides a plurality of sprinklers of a second type to define a first group and a second group of sprinklers and preferably no more than two groups, in which each group is aligned in a row between the ridge and the eave parallel to the ridge with the first and second group being spaced apart from one another equidistantly about the ridge. The sprinklers of the second type are located at a maximum upslope distance of up to twenty-seven feet from the eave. Moreover, the sprinklers of the first type and the sprinklers of the second type are off-set from one another in the downslope direction from the ridge to one of the eaves. The sprinklers of the second type generate a spray from the sprinkler with a majority of the spray directed in a downslope direction from the ridge and toward one of the eaves. The first and second type of sprinklers each provide a fluid density sufficient to define a maximum roof span of protection which is preferably seventy-two feet or more and more preferably ranges from seventy-five feet to eighty feet (75-80 ft.) and in various embodiments of the preferred system, provide a maximum roof span of protection of eighty feet (80 ft.).

BRIEF DESCRIPTION OF DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1A:
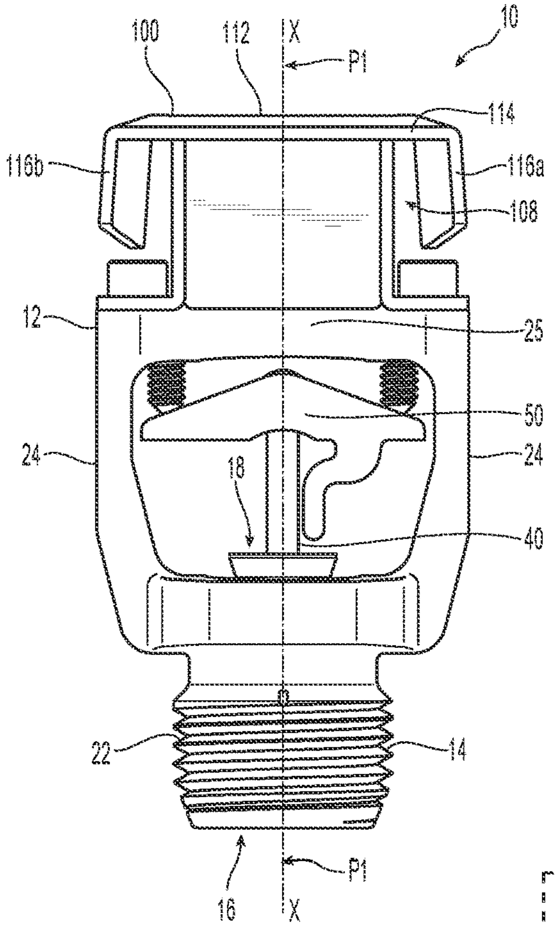
FIG. 1A is a front view of a preferred embodiment of an eave sprinkler.
Figure 1B:
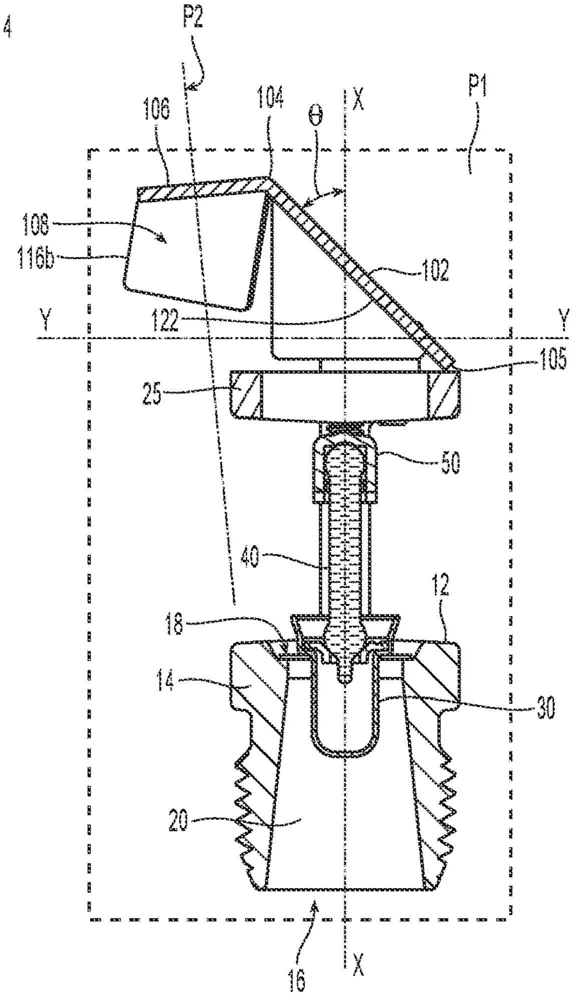
FIG. 1B is a cross-sectional view of the sprinkler of FIG. 1A.

Shown in FIGS. 1A-1B is a preferred embodiment of a fire protection sprinkler 10 for the protection of attic spaces or portions thereof. More specifically, the preferred sprinkler 10 provides for protection of the eaves region of an attic space by providing a spray pattern from the sprinkler that is capable being focused or concentrated toward the eaves region. Moreover, the preferred sprinkler 10 alone and in combination with other types of sprinklers provides for a fluid distribution that defines a span of attic protection in a three-branch system that is over sixty feet (60 ft.), preferably seventy-two feet (72 ft.) or more and more preferably ranges from seventy-five feet to eighty feet (75-80 ft.) and in various embodiments of system protection described herein, provides a maximum roof span of protection of eighty feet (80 ft.).

The preferred eave sprinkler 10 includes a frame 12 including a body 14 defining an inlet 16, an outlet 18 with a passageway 20 extending between the inlet 16 and the outlet 18 along a sprinkler axis X-X to define an orifice. The body is configured for coupling the sprinkler 10 to a fluid supply pipe SP. For example, the body 14 can include an external pipe thread 22 for coupling to a female fitting having a complementary thread for engagement with the sprinkler 10. The preferred frame 12 includes a pair of frame arms 24 to support and locate a deflector 100 at a fixed distance from the outlet 18. The pair of frame arms 24 extend from the body 14 at diametrically opposed sides of the outlet 18 with a deflector boss 25 that extends across the ends of the frame arms 24. The boss 25 is preferably an annular formation centered along the sprinkler axis X-X and coaxially aligned with the outlet at a fixed distance from the outlet 18. The deflector 100 is affixed and preferably mounted to the boss 25 to locate the deflector 100 at the fixed distance from the outlet. The deflector 100 is illustratively shown bent or formed for installation in an upright orientation in which supplied firefighting fluid is discharged from the outlet 18 to impact the deflector 100 in an upward direction.

Coupled to the frame 12 is a preferred deflector 100. The deflector 100 is preferably affixed to the sprinkler frame 12 and spaced at a fixed distance from the outlet 18 for deflecting fluid in a direction of a radial axis Y-Y that extends perpendicular to the sprinkler axis X-X. The deflector 100 includes a base portion 102 mounted to the sprinkler frame having a leading edge 104 with a flap 106 extending angularly from the leading edge 104 of the base 102. The flap 106 forms a preferred discharge channel 108 that extends in the direction of the radial axis Y-Y with the channel being preferably symmetrical about a bisecting plane P1 defined by the intersection of the sprinkler axis X-X and the radial axis Y-Y.

Figure 2A:
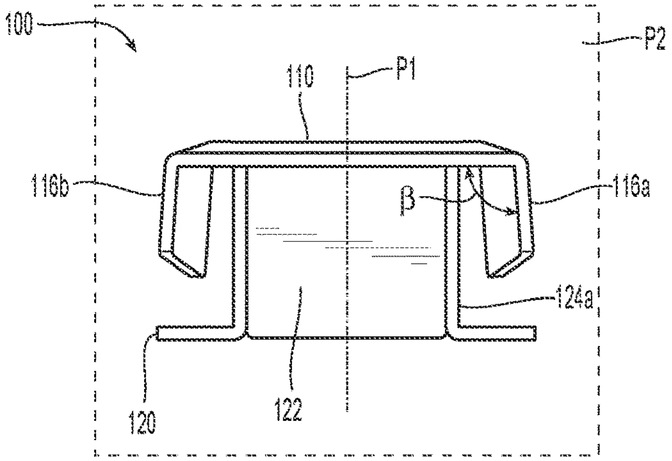
FIGS. 2A-2C are various views of a preferred deflector for use in the eave sprinkler of FIG. 1.
Figure 2B:
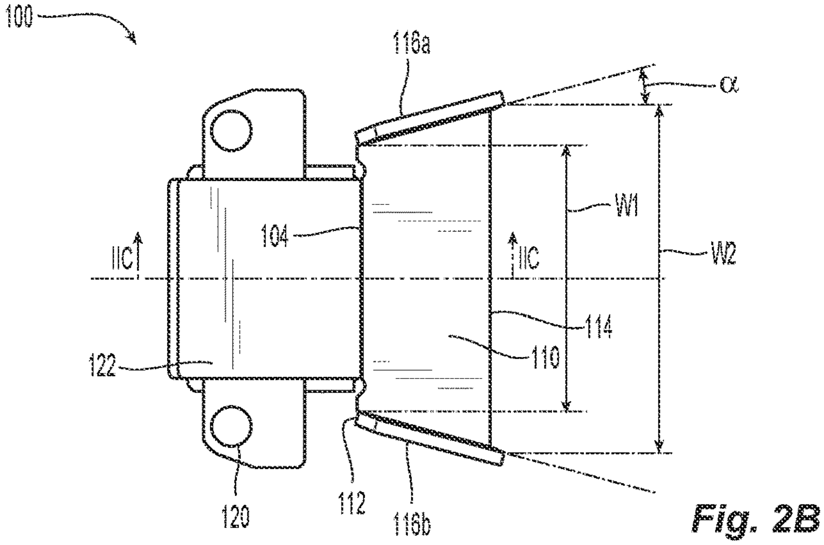
Figure 2C:
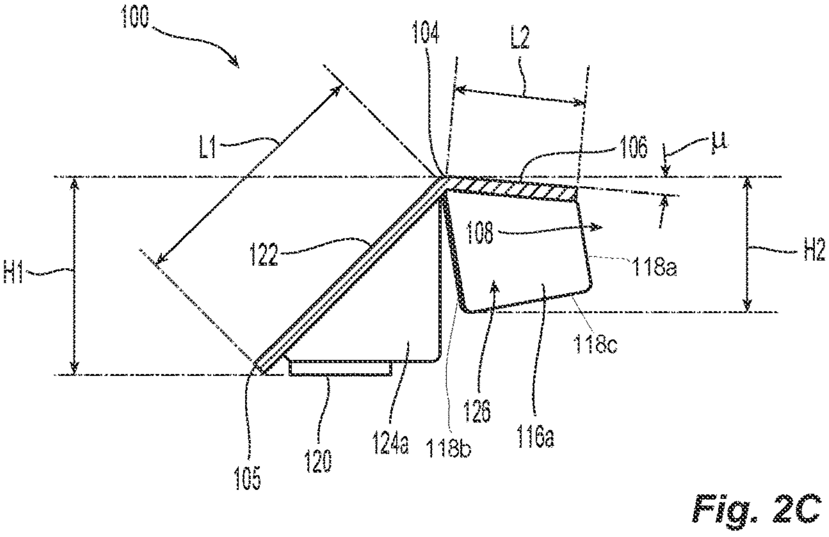

As shown in FIGS. 2A-2C, the preferred flap 106 includes a central canopy portion 110 that intersects the bisecting plane P1 with a first end 112 contiguous with the leading edge 104 of the base 102 and a second terminal end 114 forming the terminal end of the discharge channel 108 of the deflector 100. The flap 106 includes a pair of sidewalls 116*a*, 116*b* disposed about the central canopy portion 110. In the preferred deflector 100, each of the sidewalls 116*a*, 116*b* is angled with respect to the bisecting plane P1 to define an acute first included angle α such that the discharge channel 108 broadens or widens in the direction from the first end 112 to the second terminal end 114 of the flap 106. Additionally, or alternatively, lateral edges of the canopy portion 110 extend between the first and second end 112, 114 at the preferred angle α. Accordingly, in a preferred embodiment of the canopy portion 110, the second terminal end 114 has a width W2 that is greater than the width W1 of the first end 112 such that canopy portion 110 is substantially trapezoidal in shape. The second and first ends 114, 112 of the canopy portion 110 defines a preferred ratio W2:W1 that preferably ranges from 1.33:1 to 1.67:1. In a preferred embodiment of the canopy portion 110, the width W2 at the second terminal end 114 is about one inch (1 in.) and the width W1 of the canopy portion at the first end 112 is about 0.75 inch. The first acute preferably included angle α preferably ranges from ten to forty-five degrees (10°-45°), more preferably ranges from ten to thirty degrees (10°-30°), even more preferably ranges from ten to twenty degrees (10°-20°) and yet even more preferably is fifteen degrees (15°). Therefore, in preferred embodiments of the deflector flap 106, the formed discharge channel 108 is also preferably trapezoidal in shape.

Each of the sidewalls 116*a*, 116*b* also define a second included angle θ with respect to the canopy portion 110 in a plane P2 that is disposed perpendicular to the first plane P1, as seen for example in FIGS. 1B and 2A. In one preferred aspect, each of the sidewalls define a ninety degree (90°) second included angle β with the canopy portion. Alternatively, the sidewall can define an obtuse included angle β that is preferably less than 150 degrees (150°) and can more preferably be about 130 degrees (130°) or even more preferably 112 degrees (112°).

The flap portion 106 and its various features can define other dimensional relationships to the base portion 102 that can further define the spray characteristics of the sprinkler 10. The base portion 102 includes a mounting portion 120 for affixing the deflector 100 to the frame 12. Preferably, the mounting portion 120 is preferably configured as one or more flanges through which a fastener such as, for example, an Allen or hex-head screw is used to affix the deflector 100 to the frame 12. The base portion 102 further includes a central deflecting plate 122 and a pair of lateral walls 124*a*, 124*b* disposed about the deflecting plate 122 to form an intermediate flow channel 126 that extends from the frame 12 to the discharge channel 108. Preferably, the distance between the sidewalls 116*a*, 116*b* of the flap 106 is greater than the distance between the lateral walls 124*a*, 124*b* of the base 102 such that the base 102 portion is narrower than the flap portion 106. Preferably, each of the sidewalls 116*a*, 116*b* of the flap 106 has an outer leading edge 118*a*, an outer trailing edge 118*b*, and an outer terminal edge 118*c*. Each of the outer leading edge 118*a* and the outer trailing edge 118*b* are disposed at approximately the same angle with respect to the outer terminal edge 118*c*, and, more preferably, the same angle is ninety degree (90°). The same angle allows for each outer trailing edge 118*b* to be offset in the direction of the radial axis from both of the pair of lateral walls 124*a*, 124*b*. The offset provides an angular gap between the sidewalls 116*a*, 116*b* of the flap 106 and the pair of lateral walls 124*a*, 124*b* of the base 102.

The central deflecting plate 122 includes the leading edge 104 that is proximate and preferably contiguous with the flap 106. Opposite the leading edge 104, the deflecting plate 122 includes a trailing edge 105 proximate and preferably contiguous with the mounting portion 120 and the lateral walls 124*a*, 124*b*. The trailing edge 105 and the leading edge 104 of the base 102 are axially spaced apart from one another in the direction of the central axis X-X to define a preferred maximum deflector height H1. To form the intermediate channel 126, each of the lateral walls 124*a*, 124*b*, is preferably formed and shaped so as to extend axially from the trailing edge 105 to the deflector plate 122 over the total length L1 of the deflector plate 122. Accordingly, the intermediate channel 126 preferably has a triangular volume. The deflecting plate 122 preferably intersects the sprinkler axis X-X to define a skew angle θ therebetween, as seen in FIG. 1B, that preferably ranges from thirty to sixty degrees (30°-60°) and is more preferably forty-five degrees (45°). Accordingly, water discharged from the outlet 18 of the frame 12 impacts the angled deflector plate 122 and with a majority of the fluid being directed toward the discharge channel 108 of the flap 106. The flap portion is preferably angled with respect to a plane parallel to the Y-Y axis at an angle μ at less than thirty degrees (30°) to less than fifteen degrees (15°) and is more preferably five degrees (5°). Accordingly, in a preferred embodiment the canopy portion 110 of the flap 106 and the deflector plate 122 define a preferred included angle in between of about one hundred thirty degrees (130°).

Referring to FIG. 2C, the axial depth or height H2 of the flap portion 106 and its discharge channel 108 preferably varies in the axial direction of the sprinkler axis X-X from the canopy portion 110 to a peripheral edge of the sidewalls 116*a*, 116*b* over the total length L2 of the canopy portion 110. The maximum height H2Max of the flap portion is preferably less than the maximum height H1 of the base portion 102 and define a preferred ratio of base height-to-flap ratio (H1:H2Max) ranging from 1.3:1 to 2:1. The length L2 of the canopy portion 110 is preferably less than the length L1 of the deflecting portion 122; and in another preferred aspect, the ratio of the lengths L1:L2 ranges preferably from 1.3:1 to 2:1. In a preferred embodiment of the deflector 100, the length L1 of the deflecting portion 122 is about one inch (1 in.) and the length L2 of the canopy portion 110 is about 0.5 inch.

FIG. 1B shows the cross-sectional view of the frame body 14 and its internal passageway 20. Fluid supplied to the sprinkler inlet 16 flows through the internal passageway 20 and is discharged from the outlet 18 to impact the deflector 100 to address a fire. The internal passageway 20 preferably tapers narrowly from the inlet 16 to the outlet 18. The discharge characteristics from the sprinkler body 14 and its outlet orifice are preferably quantified by the industry accepted discharge coefficient or nominal K-factor defined from the formula: K-factor=Q÷√P where Q is fluid flow rate from the sprinkler for a given fluid starting pressure P, each of which is measured in appropriate metric or English units. The sprinkler body 14 defines a nominal K-factor that is preferably less than a nominal K 11.2 GPM/(PSI)$^{1/2}$ and is preferably a K 5.6 GPM/(PSI)$^{1/2}$ (hereinafter K5.6). Alternatively, the sprinkler body 14 can define a nominal K-factor of any one of 8.0 GPM/(PSI)$^{1/2}$; 4.2 GPM/(PSI)$^{1/2}$ or smaller. Further in the alternative, the sprinkler body 14 can define a nominal K-factor larger than that of a nominal K-factor 11.2 GPM/(PSI)$^{1/2}$.

Preferred embodiments of the sprinkler 10, are preferably configured as automatic sprinklers such that fluid discharge from the connected sprinkler 10 and its outlet 18 is controlled by a seal assembly 30 that is disposed within the passageway 20 proximate the outlet 18 to occlude the outlet. The seal assembly 30 is supported within outlet 18 of the sprinkler body 14 by a thermally responsive element or trigger 40 aligned along the sprinkler axis X-X between the sealing assembly 30 and a loading assembly 50. The thermally responsive element 40 is preferably embodied as a thermally responsive frangible glass bulb but can be alternatively embodied as a thermally responsive mechanical or electrically actuated assembly provided the assembly can seat and unseat the seal assembly 30 in respective unactuated and actuated states of the sprinkler. In the presence of a sufficient level of heat, the thermally responsive element 40 operates or triggers to release the sealing assembly 30 and permit the supplied fluid to discharge from the outlet 18 to impact the deflector 100 and address a fire.

When provided with a supply of firefighting fluid at a flow rate of 23 GPM, the preferred eave sprinkler directs fluid forward of the deflector 100 to a horizontal throw distance of up to twenty-eight feet (28 ft.). Laterally of the direction of throw, the sprinkler discharges over a width of eight feet (8 ft.), so as to define a preferred 8 ft.×28 ft. coverage area. Moreover, the sprinkler 10 directs fluid rearward of the deflector 100 to a rearward distance of no more than five feet (5 ft.) and more preferably up to four feet (4 ft.). Accordingly, a majority of the spray distribution is forward of the sprinkler 10. As described herein, the throw distance of the sprinkler is advantageous in protecting the low clearance eave region in sloped roof attic spaces, i.e., below gable roofs. The preferred eave sprinkler 10 provides for an attic fire protection system that can protect roof spans of over sixty feet (60 ft.) and more preferably over seventy-two feet (72 ft.) up to a preferred maximum of eighty-feet (80 ft.) with a preferred minimum number of branch lines and total sprinklers which in turn can preferably minimize the total hydraulic demand of the system.

Figure 3A:
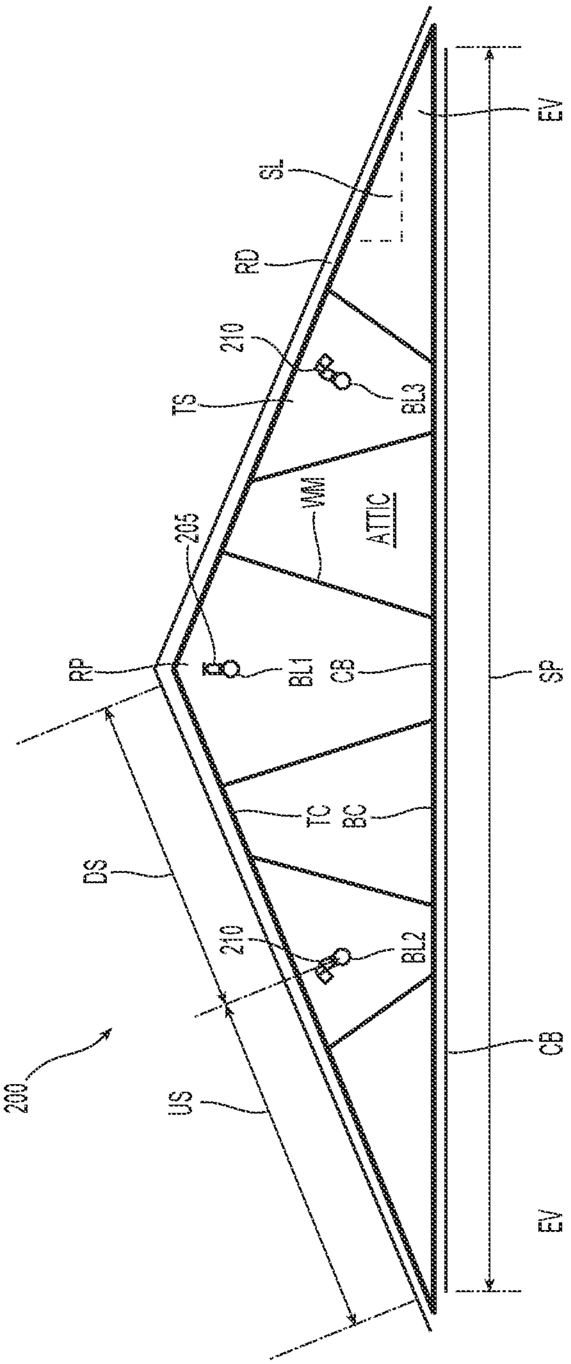
FIG. 3A is a schematic elevation view of a preferred automatic attic fire protection system.
Figure 3B:
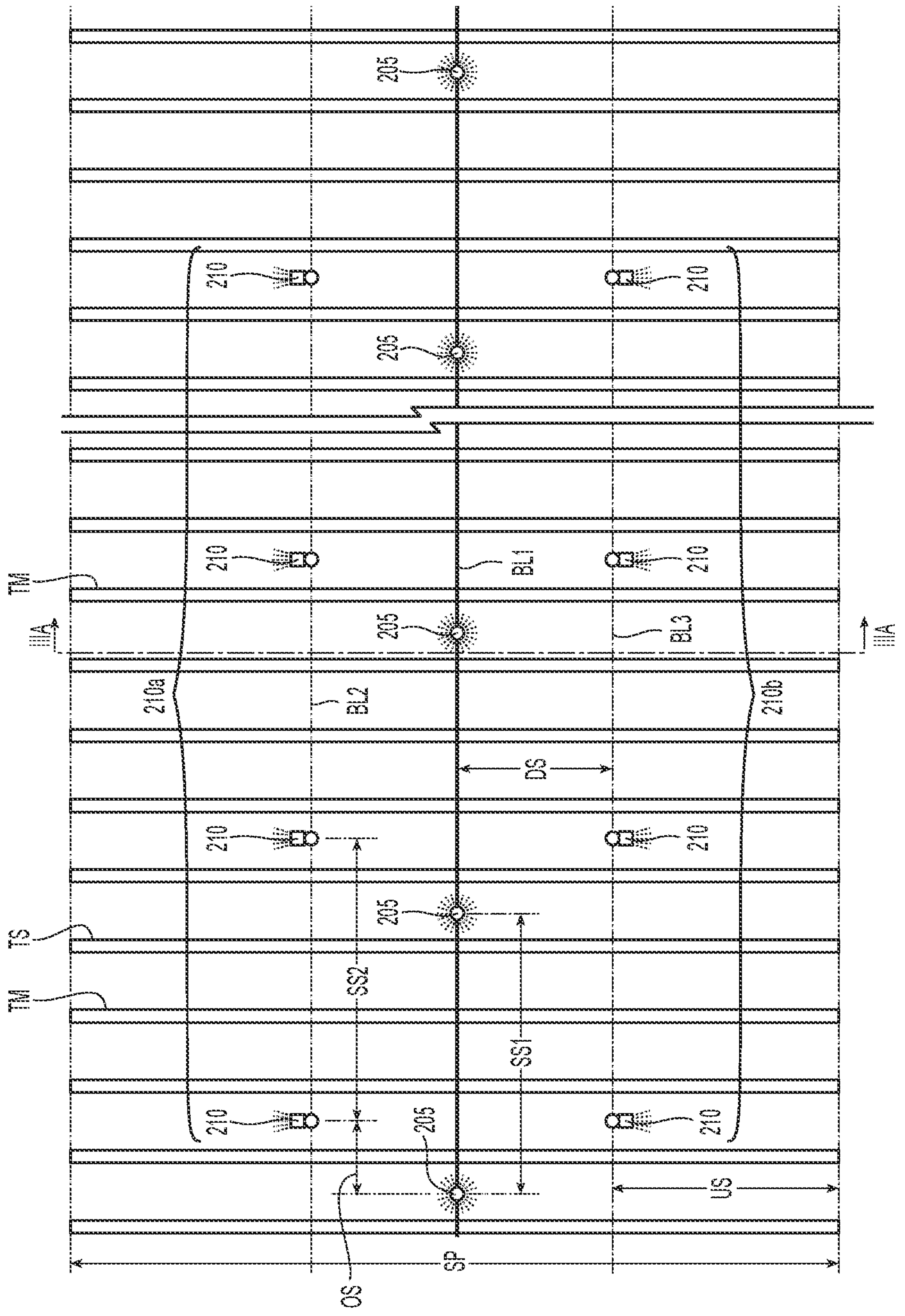
FIG. 3B is a plan view of the automatic fire protection system of FIG. 3A.

Shown in FIGS. 3A-3B are schematic views of a preferred attic fire protection system 200 installation for a sloped attic space ATTIC beneath a roof having a slope SL that ranges from 2½ inch of vertical rise for 12 inches of horizontal run (2½:12) to 12 inch of rise for 12 inches of run (12:12) and more preferably ranging from 4:12 to 12:12 and in preferred embodiments preferably ranging from 4:12 up to 6:12 and yet even more preferably ranging from 2½:12 up to 6:12. The sloped attic space ATTIC is formed between a ceiling base CB and a pair of sloped roof decks RD supported by a truss system TS defining a ridge peak RP in between with the ceiling base CB extending between and below the sloping roof decks to define a pair of eaves EV equally spaced about the ridge RP to define a preferred roof span SP of over sixty feet (60 ft.) and preferably ranging from 60 ft.-80 ft. The truss system TS generally includes a plurality of truss members TM each having a top chord TC, a bottom chord BC, and a group of angular web members WM. Shown in FIG. 3B is a plan view of the attic space in which the truss members TM are spaced apart from one another on center by less than three feet (3 ft.) and more preferably spaced on two-foot (2 ft.) centers defining channels in between.

The fire protection system 200 includes a plurality of sprinklers of a first type 205 aligned below the ridge RP in which each sprinkler of the first type is aligned along a channel and more preferably centered between two truss members TM. Each sprinkler of the first type 205 preferably provides a uniform spray pattern radially about the sprinkler and its axis. An exemplary embodiment of a sprinkler of the first type of sprinkler 205 is an upright sprinkler shown and described in technical data sheet publication, Form No. F-042517: "Attic Upright Specific Application Sprinkler VK697" (Aug. 23, 2018 Rev. 18.2) from The Viking Corp of Hastings, MI. Generally, the sprinklers 205 include a frame having a body with an inlet, an outlet and internal passageway extending between the inlet and the outlet to form the sprinkler orifice defining a preferred nominal K-factor of less than K 11.2 GPM/(PSI)$^{1/2}$ and is preferably K 5.6 GPM/(PSI)$^{1/2}$. The preferred frame includes a pair of frame arms to support and locate a deflector at a fixed distance from the outlet. The deflector is bent or formed for installation in an upright orientation in which supplied firefighting fluid is discharged from the outlet to impact the deflector in an upward direction and distributed radially in a preferred uniform distribution about the sprinkler.

The sprinklers of the first type 205 are coupled to a first branch line BL1 disposed below and parallel to the ridge RP with the deflector of the sprinkler preferably one to twelve inches (1-12 in.) of the ridge RP. The sprinklers 205 are preferably spaced from one another along the branch line BL1 at a sprinkler-to-sprinkler spacing SS1 that ranges from seven to twelve feet (7-12 ft.) and is more preferably at a sprinkler-to-sprinkler spacing of eight feet (8 ft.). When provided with an appropriate operating flow of firefighting fluid, each sprinkler 205 and its spray pattern define a preferred maximum coverage area of one hundred ninety-two square feet (192 sq. ft.) to provide a preferred minimum fluid delivery density of no less than 0.1 GPM/sq. ft. In one preferred installation, the sprinklers of the first type 205 are supplied with a minimum fluid flow of 20 GPM at 13 psi. Accordingly, each sprinkler 205 provides a preferred fluid delivery density of about 0.1 GPM/sq. ft.

The preferred eave sprinkler 10 of FIGS. 1A and 1B previously described provides a preferred embodiment of a sprinkler of second type 210 located downslope of the first type of sprinklers 205 between the ridge RP and each of the eave regions EV. Accordingly, the sprinklers of the second type 210 are preferably divided into two groups with a first group 210*a* and second group 210*b* with each group of sprinklers being aligned in a row between the ridge RP and an eave EV parallel to the ridge RP with the first and second groups 210*a*, 210*b* being spaced apart from one another preferably equidistantly about the ridge RP. Each sprinkler of the second type 210 is aligned along channel and more preferably centered between two truss members TM. Moreover, each sprinkler of the second type 210 is located within a channel that is spaced from a channel that includes a sprinkler of the first type 205. Accordingly, in the preferred installation and direction of roof span SP, the sprinklers of the second type 210 are off-set OS from sprinklers of the first type 205. The amount of off-set can range from two feet to six feet (2-6 ft.) and is preferably two feet when measured from sprinkler of a first type 205 to the next closest sprinkler 210 in a direction aligned with the peak RP.

In order to protect the eave regions EV and define the preferred roof span protection, each of the preferred eave sprinklers 210 is oriented with its axis X-X perpendicular to the sloped roof deck RD such that the majority spray distribution from the channel 108 of the deflector 100 is directed downslope toward the eaves and the minor rearward discharge is directed toward the ridge RP. The deflector 100 is preferably located within the channels beneath the roof deck RD at a preferred distance that ranges from sixteen to twenty-two inches (16-22 in.) and additionally or alternatively, one to three inches (1-3 in.) below the bottom of the top chord TC of the truss members TM.

The one group 210*a* of the eave sprinklers is coupled to a second branch line BL2 disposed preferably downslope and parallel to the first branch line BL1 and the other group 210*b* of the eave sprinklers is coupled to a third branch line BL3 disposed preferably downslope and parallel to the first branch line BL1 opposite the second branch line BL2 about the ridge RP. The sprinklers of the second type 210 are preferably spaced from one another along each of the second and third branch lines BL2, BL3 at a preferred sprinkler-to-sprinkler spacing SS2 that ranges from four to twelve feet (4-12 ft.), preferably ranges from seven to twelve feet (7-12 ft.), even more preferably ranges from four to eight feet (4-8 ft.) and is more preferably at a sprinkler-to-sprinkler spacing of eight feet (8 ft.).

When provided with an appropriate operating flow of firefighting fluid, each sprinkler 210 is capable of providing a spray pattern with a forward horizontal throw in the direction of the eave EV of twenty-eight feet (28 ft.), a rearward throw in the direction of the ridge RP of four feet (4 ft.) and a maximum lateral throw about the forward discharge of about 8 ft. Preferably, each eave sprinkler 205 and its spray pattern define a preferred maximum coverage area of two hundred twenty-four square feet (224 sq. ft.) to provide a preferred minimum fluid delivery density of no less than 0.1 GPM/sq. ft. In one preferred installation, the sprinklers of the first type are supplied with a minimum fluid flow of 23 GPM at 17 psi. Accordingly, each sprinkler 205 provides a preferred fluid delivery density of about 0.1 GPM/sq. ft.

Individually and cumulatively, the first and second type of sprinklers 205, 210 their spray patterns and the fluid distribution densities define a preferred maximum roof span of protection PSP which is preferably seventy-two feet or more and more preferably ranges from seventy-five feet to eighty feet (75-80 ft.) and in various embodiments of the preferred system, provide a maximum roof span of protection of up to eighty feet (80 ft.). Additionally, the first and second type of sprinklers 205, 210, their spray patterns and the fluid distribution densities individually and cumulatively can provide for protection over the range of roof slopes SL to define a roof slope of protection SLP that preferably ranges from 2½:12 to 12:12 to provide roof slope protection SLP ranging therebetween including 4:12 to 12:12, 4:12 to 6:12 and more preferably 2½:12 to 6:12. With reference to FIG. 3B, the directional spray sprinklers of the second type 210 are preferably located twelve to thirty feet (12-30 ft.) downslope DS of the uniform distribution sprinklers of the first type 205 and more preferably, fifteen to twenty-six feet (15-26 ft.) downslope and even more preferably a minimum sixteen feet (16 ft.) downslope of the uniform distribution sprinklers of the first type 205. With the preferred downslope spacing between the first and second type of sprinklers 205, 210, the system 200 with the preferred three branch system arrangement can provide for the preferred maximum roof span of fire protection PSP of up to eighty feet (80 ft.) when the sprinklers of the first type 205 are supplied with firefighting fluid at a minimum flow of at least 20 GPM and the sprinklers of the second type 210 are supplied with firefighting fluid at a minimum flow of at least 23 GPM. Moreover, the preferred installation of the directional sprinklers 210 provide for protection of the eaves EV at a maximum distance of up to twenty-seven feet (27 ft.) upslope US from the eave EV. By maximizing the installation distance from the eave EV, sprinkler installation can be made easier by providing for a greater clearance between the roof deck RD and the ceiling deck CD. The roof span of protection preferably varies directly with the fluid supply flow, pressure and/or the downslope distance between the sprinkler of the second type 210 and the sprinkler of the first type 205 such that one or more of the variable can be reduced to reduce the roof span of fire protection of the system 200. For example, for protection of a roof span of seventy-two feet (72 ft.) the sprinklers of the first type 205 are supplied with firefighting fluid at a flow of at least 20 GPM and the sprinklers of the second type 210 are supplied with firefighting fluid at a flow of 20 GPM with the eave sprinklers 210 are preferably located sixteen feet (16 ft.) downslope of the sprinklers of the first type 205.

The system 200 is preferably hydraulically configured by providing the preferred fluid flow to a number of design sprinklers which preferably range from 1 to no more than five (1-5) design sprinklers. The design sprinklers are an identified number of "most hydraulically remote sprinklers" subject to one or more design criteria. In satisfying the preferred hydraulic criteria of the system, it can be shown by hydraulic calculation that if all design sprinklers activate, the piping and supply can provide the required fluid flow. Alternatively, or additionally, the hydraulic criteria of the system can be shown by hydraulic calculation, that if all design sprinklers activate the piping and supply can provide a minimum operating pressure, for example, 7 psi. of firefighting fluid, the design sprinklers provide for a minimum fluid density of 0.1 GPM/sq. ft. over a design area defined by the number of design sprinklers defined by their respective coverage areas.

Preferably, the system 200 is hydraulically configured to satisfy the greatest hydraulic demand as defined from the following criteria: (i) one to no more than five adjacent design sprinklers of the first type 205 located at the peak having minimum flow at the preferred 20 GPM; (ii) one to no more than five adjacent design sprinklers of the second type 210 having a minimum flow at the preferred 23 GPM; (iii) no more than five adjacent design sprinklers that includes at least one sprinkler of the first type 205 and at least one sprinkler of the second type 210 each having minimum flows at the respective preferred flow rates; and/or (iv) no more than four adjacent design sprinklers that includes at least two sprinklers of the first type 205 and at least one sprinkler of the second type 210 each having minimum flows at the respective preferred flow rates.

Given the fluid distribution of the preferred eave sprinkler 10, a preferred method of fire protection of an attic space is provided that can include obtaining sprinklers for protection of the eave regions with a directional fluid distribution; and providing the plurality of eave sprinklers for installation downslope of a plurality of sprinklers located at the ridge peak having a uniform fluid distribution to define a maximum roof span protection of up to eighty feet (80 ft.). Obtaining a preferred sprinkler can include any one of manufacturing or acquiring the preferred sprinklers; and providing can include any one of selling, specifying, or supplying the preferred sprinklers for installation in a preferred manner as described herein.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A fire protection system for a sloped attic space defined by a pair of sloped roof decks defining a ridge in between with a ceiling base extending between and below the sloping roof decks to define a pair of eaves equally spaced about the ridge to define a roof span, the system consisting of:

a first plurality of sprinklers aligned below the ridge and coupled to a first branch line below and parallel to the ridge, each sprinkler of the first plurality of sprinklers having a frame defining an inlet, and an outlet with a passageway extending between the inlet and the outlet along a sprinkler axis, and a seal assembly supported within the outlet by a heat-responsive actuator that in the presence of a sufficient level of heat operates to release the seal assembly and permit a fluid to discharge from the outlet, each sprinkler of the first plurality of sprinklers including a deflector affixed to the frame of the sprinkler of the first plurality of sprinklers at a fixed distance from the outlet to generate a uniform spray pattern radially about the sprinkler and the sprinkler axis; and a second plurality of sprinklers different than the first plurality of sprinklers consisting of a first group of sprinklers and a second group of sprinklers, each of the first and second group of sprinklers being aligned in a row between the ridge and the eave parallel to the ridge, the first group of sprinklers coupled to a second branch line parallel to the first branch line and the second group of sprinklers coupled to a third branch line parallel to the first branch line, the first and the second group being spaced apart from one another equidistantly about the ridge, each sprinkler of the second plurality of sprinklers having a frame defining an inlet, and an outlet with a passageway extending between the inlet and the outlet along a sprinkler axis, and a seal assembly supported within the outlet by a heat-responsive actuator that in the presence of a sufficient level of heat operates to release the seal assembly and permit a fluid to discharge from the outlet, each sprinkler of the second plurality of sprinklers including a deflector affixed to the frame of the sprinkler of the second plurality of sprinklers at a fixed distance from the outlet to generate a spray from the sprinkler with a majority of the spray directed in a downslope direction from the ridge and toward one of the eaves, wherein the first plurality of sprinklers and the second plurality of sprinklers each providing a fluid density sufficient to define a roof span of protection of eighty feet (80 ft.), and wherein the sprinklers of the second plurality of sprinklers being located at a maximum upslope distance of up to twenty-seven feet from the eave.

2. The system of claim 1, wherein the first plurality of the sprinklers and the second plurality of the sprinklers are off-set from one another in the downslope direction from the ridge to one of the eaves.

3. The system of claim 2, wherein the first group of sprinklers of the second plurality of sprinklers are spaced apart from one another along the second branch line by a sprinkler-to-sprinkler spacing of eight feet (8 ft.), wherein the second group of sprinklers of the second plurality of sprinklers are spaced apart from one another along the third branch line by a sprinkler-to-sprinkler spacing of eight feet (8 ft.).

4. The system of claim 3, wherein the first plurality of sprinklers are spaced apart from one another along the first branch line by a sprinkler-to-sprinkler spacing of eight feet (8 ft.), the first branch line being centered between the second and third branch lines.

5. The system of claim 3, wherein the first and second branch lines are spaced apart from one another by twenty-four feet in a direction of a roof span.

6. The system of claim 5, wherein a maximum hydraulic demand of the system is based upon the greater of no more than five sprinklers of the first plurality of sprinklers flowing at 20 GPM or no more than three sprinklers of the first plurality of sprinklers flowing at 20 GPM and two sprinklers of the second plurality of sprinklers flowing at 23 GPM.

7. The system of claim 5, wherein the deflector of each of the sprinklers of the second plurality of sprinklers includes a base and a flap extending angularly from the base, the flap including a trapezoidal canopy portion and a pair of sidewalls disposed about the trapezoidal canopy portion.

8. The system of claim 1, wherein the first plurality of sprinklers and the second plurality of sprinklers each providing a fluid density sufficient to define a roof slope of protection that ranges from 2½:12 to 6:12.

9. A method of fire protection of an attic space defined by a ridge peak and eave regions disposed about the ridge peak, the method comprising:

obtaining a plurality of eave sprinklers for protection of the eave regions with a directional fluid distribution; and providing the plurality of eave sprinklers for installation downslope of a plurality of attic sprinklers located at the ridge peak, each of the plurality of attic sprinklers configured to generate a uniform spray pattern radially about the sprinkler and its axis, in an automatic fire protection sprinkler system consisting of three branch lines parallel to the ridge peak to define a roof span protection of eighty feet perpendicular to the length of the ridge peak, wherein each of the plurality of eave sprinklers and each of the plurality of attic sprinklers comprises an automatic fire protection sprinkler having a heat-responsive actuator that maintains a fluid tight seal at a discharge orifice by exertion of pressure on a sealing assembly and operates at a pre-selected temperature value indicative of a fire to release the sealing assembly and permit a flow of fluid through the discharge orifice.

10. The method of claim 9, wherein obtaining the plurality of eave sprinklers includes affixing a deflector to a sprinkler frame, and wherein the deflector includes a base with a flap extending angularly from the base, the flap including a central canopy portion and a pair of sidewalls disposed about the central canopy portion, the central canopy portion including a first end and a second terminal end, each of the pair of sidewalls being angled with respect to a bisecting plane to define a discharge channel that broadens in the direction from the first end to the second terminal end.

11. The method of claim 10, wherein the base includes a deflecting plate, and wherein the deflecting plate defines a first length and the canopy portion defines a second length, and a ratio of the first length to the second length ranges from 1.3:1 to 2:1.

12. The method of claim 10, wherein each of the first end and the second terminal end of the central canopy portion have a width to define a ratio of a second end width-to-first end width that ranges from 1.33:1 to 1.67:1.

13. The method of claim 10, wherein the central canopy portion is trapezoidal in shape.

14. The method of claim 9, wherein providing the plurality of eave sprinklers for installation includes providing a first group and a second group of the plurality of eave sprinklers for installation aligned in a row between the ridge and one of the eave regions parallel to the ridge with the first and second group being spaced apart from one another equidistantly about the ridge, the plurality of eave sprinklers being off-set from the plurality of attic sprinklers in a direction from the ridge to one of the eave regions.

15. The method of claim 14, wherein the plurality of attic sprinklers are spaced apart from one another along a first branch line by a sprinkler-to-sprinkler spacing of eight feet (8 ft.), wherein the first group of the plurality of eave sprinklers are spaced apart from one another along a second branch line by a sprinkler-to-sprinkler spacing of eight feet (8 ft.), wherein the second group of the plurality of eave sprinklers are spaced apart from one another along a third branch line by a sprinkler-to-sprinkler spacing of eight feet (8 ft.), and wherein the first branch line being centered between the second and third branch lines.

16. The method of claim 15, wherein the first and second branch lines are spaced apart from one another by twenty-four feet in a direction of the roof span.

17. The method of claim 9, wherein providing the plurality of eave sprinklers define a roof slope of protection that ranges from 2½:12 to 6:12.

* * * * *